(12) United States Patent
Dryfoos et al.

(10) Patent No.: US 8,301,609 B1
(45) Date of Patent: Oct. 30, 2012

(54) COLLISION DETECTION AND DATA CORRUPTION PROTECTION DURING AN ON-LINE DATABASE REORGANIZATION

(75) Inventors: Robert O. Dryfoos, Hopewell Junction, NY (US); Christopher D. Filachek, Lagrangeville, NY (US); Mark A. Lehrer, Hyde Park, NY (US); Steven E. Roach, Lagrangeville, NY (US); Michael J. Shershin, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/234,346

(22) Filed: Sep. 16, 2011

(51) Int. Cl.
G06F 17/30 (2006.01)

(52) U.S. Cl. .......................... 707/704; 707/809

(58) Field of Classification Search .................. 707/704, 707/809
See application file for complete search history.

(56) References Cited

U.S. PATENT DOCUMENTS

| | | | |
|---|---|---|---|
| 5,721,915 A * | 2/1998 | Sockut et al. ........................... | 1/1 |
| 6,026,412 A * | 2/2000 | Sockut et al. ........................... | 1/1 |
| 6,411,964 B1 * | 6/2002 | Iyer et al. ............................... | 1/1 |
| 6,950,834 B2 * | 9/2005 | Huras et al. .................... | 707/610 |
| 7,117,229 B2 | 10/2006 | Marshall et al. | |
| 7,970,748 B2 | 6/2011 | Romine et al. | |

OTHER PUBLICATIONS

Betty Salzberg and Allyn Dimock, "Principles of Transaction-Based On-Line Reorganization", 1992, Proceedings of teh 18th VLDB Conference Vancouver, British Columbia, pp. 511-520.*

Gary H. Sockut and Balakrishna R. Iyer, "Online Reorganization of Databases", ACM Computing Surveys, vol. 41, No. 3, Article 14, Jul. 2009, pp. 1-136.*

IBM, "z/Transaction Processing Facility Enterprise Edition", Database User's Guide Version 1 Release 1, IBM Corp. 2005, 2011, pp. 1-16.*

Edward Omiecinski, Liehuey Lee, and Peter Scheuermann, "Concurrent File Reorganization for Record Clustering: A Performance Study", IEEE, 1992, pp. 265-272.*

Chendong Zou and Betty Salzberg, "Safely and Efficiently Updating References During On-line Reorganization", Proceedings of the 24th VLDB Conference New York, USA, 1998, pp. 512-522.*

Edward Omiecinski, Liehuey Lee, and Peter Scheuermann, "Performance Analysis of a Concurrent File Reorganization Algorithm for Record Clustering", IEE, 1994, pp. 248-257.*

* cited by examiner

*Primary Examiner* — Cheryl Lewis
(74) *Attorney, Agent, or Firm* — Cantor Colburn LLP; Steven Chiu (57) ABSTRACT

A method for identifying a set of records in a database for relocation during an on-line database reorganization (ODBR) process. The relocating includes, for each of the records in the set: requesting a record reorganization lock (RRL) on the record, receiving the RRL, retrieving data from the current location of the record, storing the data in the new location of the record, and releasing the RRL. A request is received to update a target record in the set of records with updated data. The receiving of the request is from an application and overlaps in time with at least a portion of the relocating. Independent of the application, a RRL is received on the target record and the target record is updated by writing target data to the target record in the current location and writing the target data to the target record in the new location.

20 Claims, 7 Drawing Sheets

COLLISION DETECTION AND DATA CORRUPTION PROTECTION DURING AN ON-LINE DATABASE REORGANIZATION

BACKGROUND

The present invention relates generally to on-line (O/L) database reorganization (ODBR) in O/L transaction processing (OLTP) systems, and more particularly to collision detection and data corruption protection during an ODBR.

In certain computing environments, multiple processors communicate with multiple control units to provide access to storage devices. In many cases, two or more processors access data located in a single, shared database. Locking mechanisms and application agreed upon protocols have been implemented in these environments to serialize accesses to the database in order to protect data integrity. Locking mechanisms are of particular importance when a portion of the data in the shared database is scheduled to be updated by an application executing on one of the processors. In this case, the application is typically given an "exclusive lock" that prevents other applications and/or processors from accessing the data while it is being updated.

Database reorganizations are performed to reconfigure and relocate data records within a database. Database reorganizations may be utilized to improve the performance of database accesses. For example, a database reorganization may be used to build new indexes or to store existing indexes in a different format. Additionally, database reorganizations may be used to store data that is frequently accessed as a unit in a manner that provides high performance access for particular applications. Database reorganizations may also be performed when additional storage devices are made available to store data located in the database (e.g., due to system growth). During database reorganizations, it is important that the contents of the data records being reconfigured and/or relocated are not corrupted.

SUMMARY

An embodiment is a method, system, and computer program product for identifying a set of records in a database for relocation during an on-line database reorganization (ODBR) process. Each record in the set is associated with a unique record reorganization lock (RRL). The set of records is relocated from a current location to a new location. The relocating includes, for each record in the set of records: requesting a record reorganization lock (RRL) associated with the record, receiving the RRL associated with the record to prevent access to both the current location and the new location of the record, retrieving data from the current location of the record, storing the data in the new location of the record, and releasing the RRL associated with the record. A request is received to update a target record in the set of records with updated data. The receiving a request to update a target record overlaps in time with at least a portion of the relocating, and is received from an application. A RRL associated with the target record is requested, independently of the application, to prevent access to both the current location and the new location of the target record. The RRL associated with the target record is received and the target data is written to both the current location and the new location. The RRL associated with the target record is released.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment provides serialization of data record updates and prevents corruption of data during a reconfiguration and relocation of data elements in an on-line transaction processing (OLTP) system that includes a processor complex network(s) connected to a common external resident database, such as a direct access storage device DASD farm. As used herein, the term "on-line transaction processing system" or "OLTP system" refers to a class of systems which facilitates and manages transaction-oriented applications, typically for data entry and retrieval transactions in a number of industries such as banking, airlines, mail order, supermarkets, and manufacturers. This class of systems usually requires 24 hour availability 365 days per year, and has strict service level agreements (SLAs) for time-sensitive data transfers and updates which must be processed and responded to immediately. An OLTP system may include one or more processors. The reconfiguration and relocation of data elements is referred to here in as a database reorganization. As used herein, the term "O/L database reorganization" or "ODBR" refers to a reorganization of databases in OLTP systems while permitting the concurrent processing of typical transactional traffic. OLTP systems require high availability and thus it is desirable to reduce or eliminate the need for a system outage during the reorganization process.

Contemporary ODBR requires an outage to at least portions of the OLTP system while the ODBR is being executed. This outage is often unacceptable to companies that run worldwide high performance OLTP systems. Attempts have been made to reduce this outage by capturing an image of the OLTP system from one set of DASD and restoring the system on another set of DASD followed by a restore of any captured updates that occur to the OLTP system while the new system is being built. As the size of OLTP systems have grown larger, a significant cost in terms of additional hardware and specialized software modifications are incurred using this approach.

To combat the issue with system outage time and the additional cost associated with duplicate DASD farms, ODBR packages that perform the data relocation process in an OLTP system while the system is actively processing transactions have been developed. There are generally two approaches with these types of packages. A first approach restricts the OLTP system to a single processor operation while actual data movement is being executed. Additional processors are only allowed in the complex when data movement has either completed or has been paused. A second approach permits multiple O/L processors to be active in the complex while one of the processors moves/copies data to its new location. This is then followed by an extensive verification processes to validate the accuracy and concurrency of the data records at the current and the new locations. Records found to be inconsistent between old (previously current locations) and new locations are selectively moved again.

Both of the above approaches impact the operation of the OLTP system. The first approach limits the number of processors allowed to handle traffic during an ODBR session, potentially impacting system response time for transactions beyond that described in service level agreements (SLAs). The impact can be extended considerably if the ODBR must be paused through peak traffic periods. The second approach described above does not ensure complete data integrity since there are no controls that serialize updates made by customer application packages on a secondary processor while the same data record is being move to the new location on the primary processor. Running of a complete verification of the data between the old and new locations can take considerable time and will impact transaction response time.

In exemplary embodiments of the novel collision detection and data serialization process described herein, data integrity is ensured during an ODBR process in an active OLTP system. As used herein, the term "collision" refers to an attempt to update a record concurrent with relocation by an ODBR package. The OLTP system may use either a single or a multiple processor configuration. As used herein, the term "active OLTP system" refers to an OLTP system composed of one or more O/L processors that are processing business transactions. Collision detection and data corruption protection during an ODBR incorporates the use of synchronized (across the complex) and processor unique control tables, external lock facilities, and special/exclusive record reorganization locks (RRLs). The invocation of RRLs is transparent to typical end-user applications. RRLs are at a data record level when customer updates are being written to their current location on the external data storage system. The RRL lock is set in the external locking facility used by the system for shared or exclusive locks associated with the data record during normal locking protocols.

There are two cases where the RRL is obtained. In the first case, the RRL is obtained and held by the operating system (OS) in an exclusive state while an application update for the record is applied to the current file location. A copy of the updated data record is also stored at the new file location (location where record will be stored after the reorganization is complete). When the all of the writes, to both the current and new file location (both prime and mirrored copies), are completed successfully, the RRL is automatically scheduled for release by the OS. This RRL locking process occurs inside of standard locking protocols used by the customer application and OLTP system and will not impact the effectiveness of the standard locking protocols.

The second case where the RRL is used is to provide the ability for the ODBR to retrieve data records targeted for relocation under protection of the RRL. The new record read process first requests exclusive write control for the record by first obtaining the RRL for that record. Once retrieved, the data record is read from the current location and written to the new file location. Upon successful completion of the write to the alternate location, the RRL is scheduled for release.

Figure 1:
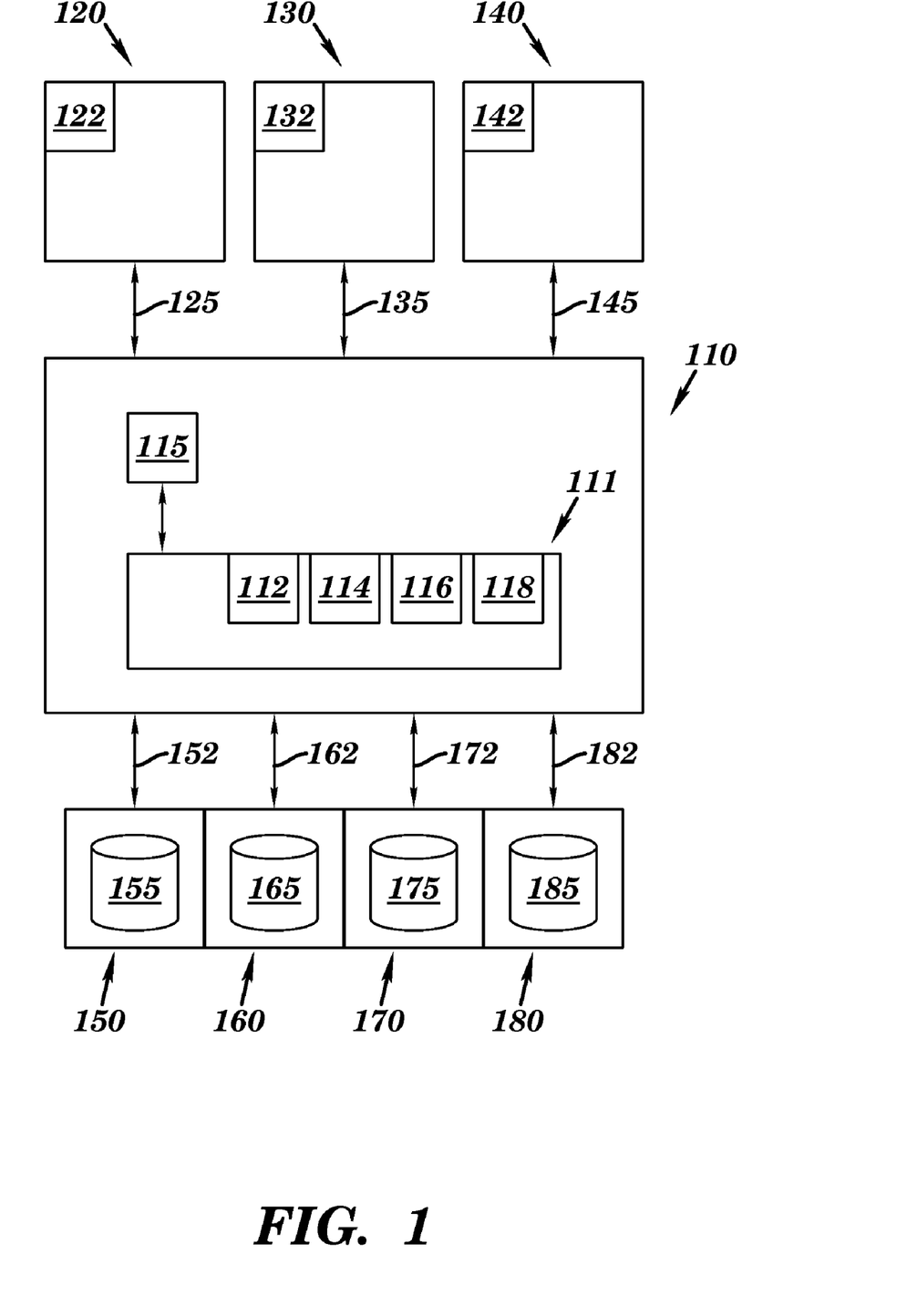
FIG. 1 illustrates a block diagram of a system for collision detection and data corruption prevention during an on-line database reorganization (ODBR) in accordance with an embodiment.

FIG. 1 illustrates a block diagram of a system for collision detection and data corruption prevention during an ODBR in accordance with an embodiment. The system shown in FIG. 1 includes a control unit 110, a plurality of computing devices 120, 130, and 140 in communication with the control unit 110, and a plurality of data storage devices 150, 160, 170, and 180 in communication with the control unit 110. Data storage devices 150, 160, 170, and 180 are physical devices including, but not limited to a magnetic disk drive, an optical disk drive, and an electronic storage device. Alternatively, the data storage devices 150, 160, 170 and 180 are logical devices. The control unit 110 may be collocated with one or more of computing devices 120, 130, and/or 140. The control unit 110 may also be located remotely from any of the interconnected computing devices 120 130, and/or 140.

It will be appreciated that the number of computing devices 120, 130, 140 may be more than three, less than three or equal to three (as shown in FIG. 1). Each computing device 120, 130, and 140 may include a host computer, a mainframe computer, server, workstation, and combinations thereof, including an operating system such as z/TPF, z/OS, MVS, LINUX, etc. (z/OS is a registered trademark, and MVS is a trademark, of IBM Corporation; and LINUX is a registered trademark of Linus Torvald). As shown in the embodiment in FIG. 1, an instance of an OLTP (e.g., z/TPF) 122, 132, and 142 is executing on each of the computing devices 120, 130, and 140 respectively.

It will be appreciated that the number of data storage devices 150, 160, 170, and 180 may be more than four, less than four or equal to four (as shown in FIG. 1). As shown in FIG. 1, the storage devices 150, 160, 170, and 180 are in communication with the control unit via communication links 152, 162, 172, and 182. Referring to FIG. 1, data storage device 150 is shown as including volume 155. Similarly, data storage devices 160, 170, and 180 are shown as including volumes 165, 175, and 185 respectively. In certain embodiments, volumes 155, 165, 175, and 185 are logical volumes.

In exemplary embodiments, volumes 155, 165, 175, and 185 comprise information storage media. As those skilled in the art will appreciate, if data storage device 150 is a magnetic disk drive, then information storage medium 155 is a magnetic disk. If data storage device 150 is an optical disk drive, then information storage medium 155 is an optical disk. If data storage device 150 is an electronic storage device, then information storage medium 155 may be one or more of a programmable read only memory (PROM), an erasable PROM (EPROM), an electrically EPROM (EEPROM), a flash PROM, a compact flash, a smart media, and the like.

The control unit 110 includes a processor 115 in communication with memory 111. Microcode/instructions 112, multi-path lock facility (MPLF) 114, MPLF queue 116, and a plurality of unsolicited status suppression indicators 118, are encoded in memory 111. The control unit 110 communicates with computing device 120 via a plurality of communication pathways 125. In certain embodiments, the plurality of communication pathways 125 utilize an I/O protocol selected from the group consisting of enterprise systems connection (ESCON), fibre optics connection (FICON), and the like. Similarly, the control unit 110 communicates with computing devices 130 and 140 via a plurality of communication pathways 135 and 145 respectively. In certain embodiments, the plurality of communication pathways 135 and 145 each utilize an I/O protocol selected from the group consisting of ESCON, FICON, and the like.

In certain embodiments, the plurality of communication pathways 125, 135, and 145 each comprise (N) logical paths. In certain embodiments, (N) is 1024. In other embodiments, (N) is less than 1024. In still other embodiments, (N) is greater than 1024. In certain embodiments, a subset (M) of the (N) logical communication paths are used to communicate MPLF interrupts from the control unit 110 to the computing device 120, wherein (M) is greater than or equal to 1 and less than or equal to (N).

Because computing devices 120, 130, and 140 can read information from and/or write information to, the same data storage devices, the OLTP element in each computing device 120, 130, and 140 controls access to individual records/files through use of logical locks. When requesting access to information encoded in one or more of the data storage devices 150, 160, 170, and 180 in communication with the control unit 110, a requesting computing device sends a lock request to the control unit 110, where that lock request recites a storage address for a particular volume, either logical or physical, and a pathway, either logical or physical, to access that volume. The RRL is a type of lock that may be requested from the control unit 110.

A multi-path lock facility (MPLF) algorithm comprising MPLF commands and attentions are utilized to indicate to a computing device if there is contention for a lock on a particular record, and to further notify that computing device when the requested lock on the record becomes available. A computing device waiting for a lock on the record will not process any additional transactions related to the record until the lock is available. Subsequent transactions involving the record will be queued behind waiting for the lock. As a result, it is desirable that a communication pathway remain available to notify a waiting computing device that a requested lock has become available. Instead of MPLF locking in the control unit, a coupling facility (CF) may be used as an external locking facility (ELF).

Figure 2:
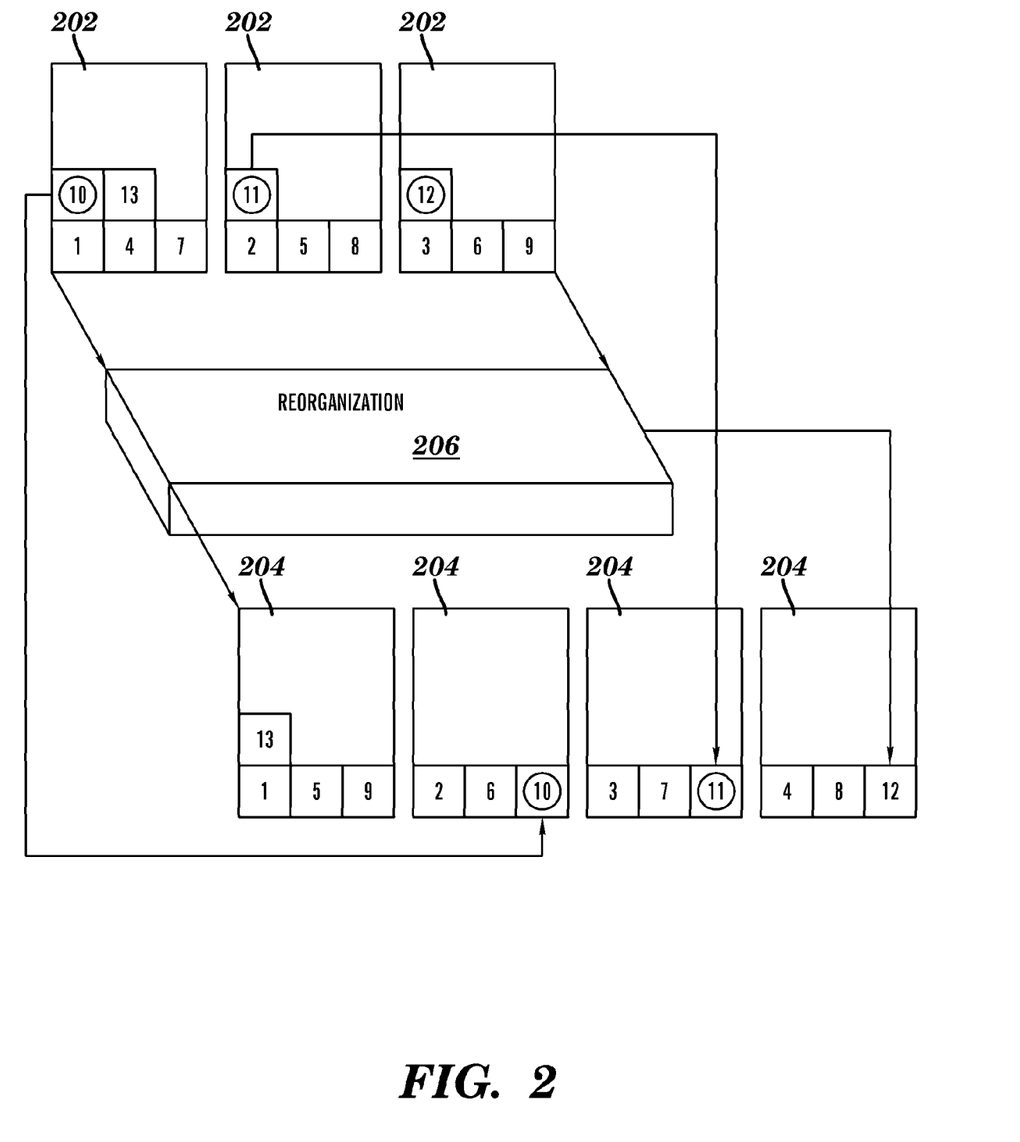
FIG. 2 illustrates a block diagram of an ODBR process in accordance with an embodiment.

FIG. 2 illustrates a block diagram of a reorganization process in accordance with an embodiment. The example shown in FIG. 2 uses a z/TPF database. As shown in FIG. 2, the current z/TPF database includes records and is located on three storage devices 202 (e.g., a DASD). The z/TPF database goes through a reorganization process 206 to move it to a new location on four storage devices 204. As shown in FIG. 2, the reorganization process 206 places logically adjacent records (e.g., 2 follows 1, 3 follow 2, etc.) on different physical storage devices 204. This known as a horizontal record allocation and may lead to improved performance when accessing the records in the database.

Figure 3:
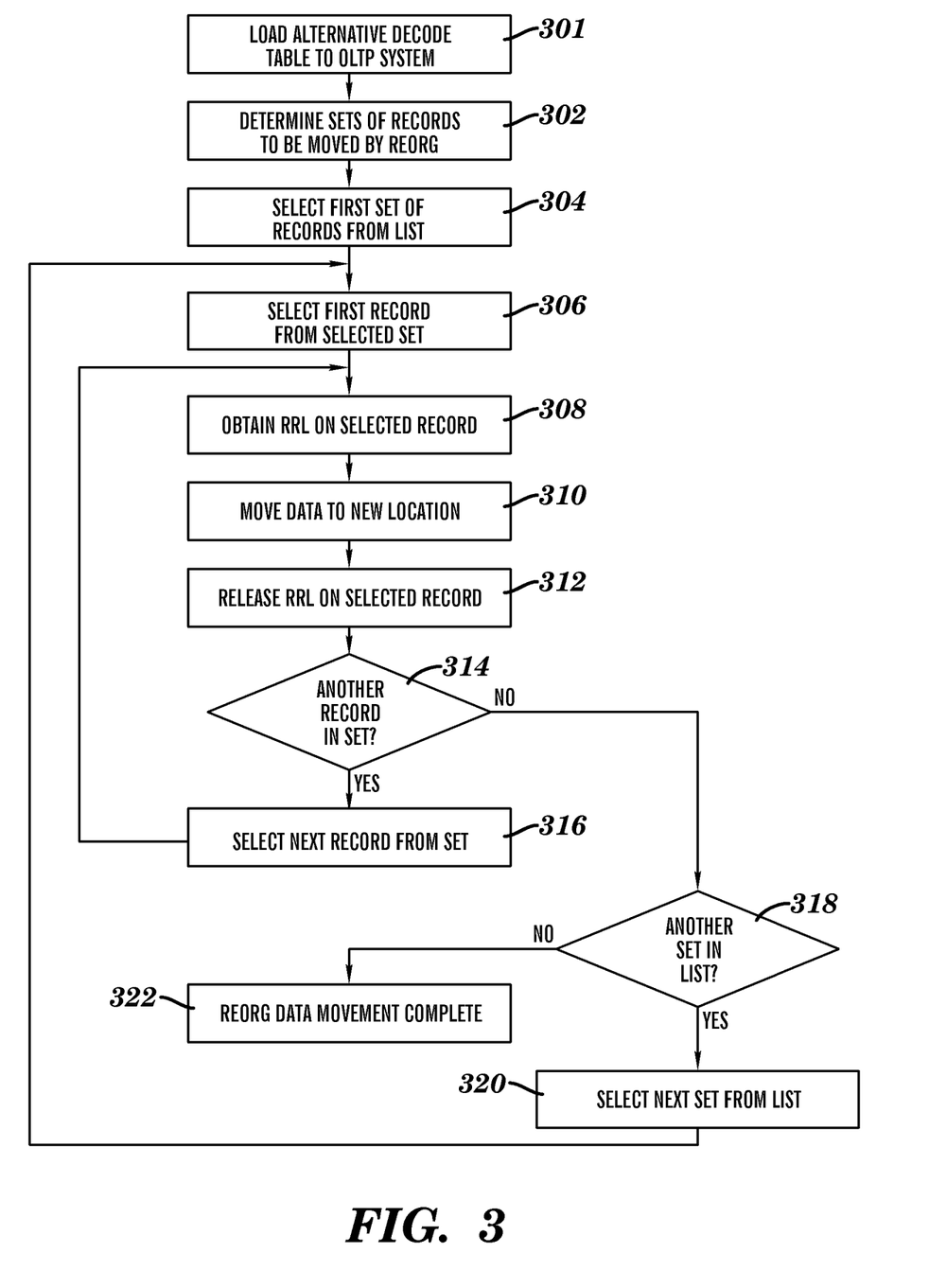
FIG. 3 illustrates a process flow for performing an ODBR process in accordance with an embodiment.

FIG. 3 illustrates a process flow for performing a reorganization process in accordance with an embodiment. The ODBR record relocation logic described herein is executed on a processor in an environment such as z/TPF 122 on computing device 120 in FIG. 1. To perform the ODBR, a second decode table referred to as an alternate decode table is loaded to the OLTP system at block 301. The alternate decode table has a similar set of statements in it to define the database, but the statements are reordered to represent the desired location of the data after the OLTP system moves them to the target location. The ODBR logic determines the sets of records to be moved during the ODBR at block 302. The alternate decode table entries are compared with the existing decode table entries and a table of record moves is built based upon which statements are in different locations. The table of record moves is referred to as an ODBR move schedule table (OMST). The OLTP system uses the OMST to manage the relocation and validation of these records. The contents of the OMST are the sets of record definitions that are to be moved during the ODBR.

As used herein, the term "decode table" refers to a memory resident table containing one or more sets of record definitions used by the operating system to map the logical reference for a record to its physical location on the external storage device. As used herein, the term "set of records" refers to a collection of one or more records defined in a decode table that are logically related, form a portion or all of a file within the database and are grouped in terms of its physical location on the external storage device. As used herein, the term "record" refers to a set of related data fields written as a single contiguous entity to an external storage device.

At block 304, when a set of data records are selected for movement by the ODBR logic, an in-memory control table will be locked, updated, and synchronized across all processors in the transaction processing complex via standard access/locking processes (e.g., MPLF). At block 306, a record from the set is selected for being moved to the new location. Moving the set, one record at a time allows the RRL to apply to a small subset of the data and lessens the chance that another application will be waiting for the RRL to be released. In another embodiment, two or more records may be moved to the new location at a time.

When a single record is actively being copied from its current (original) location to its new (alternate) location, the ODBR logic uses a new integrated process. As shown in FIG. 3, at block 308, this process obtains exclusive ownership of the RRL for the selected data record. In addition, the ODBR logic also executes a read of the data record from its current location on DASD (or other external storage device). If RRL exclusive ownership for this request cannot be obtained immediately, the request will be queued until the exclusive ownership of the RRL is obtained and then the data will be read from DASD. When the I/O operation completes, control is passed back to the ODBR logic which requested the data record. At this point, block 310 is performed and the ODBR logic executes another new process, which moves (copies) the data record to the new location (both primary and mirrored copy if necessary). The RRL will be retained until after the record and its mirrored copy are successfully written to the targeted alternate location. At that time, at block 312, the ODBR logic initiates a release of exclusive ownership of the RRL for that record. As shown in blocks 314 and 316, the processing of blocks 308-312 continues for each record in the set, and as shown in blocks 318 and 320, the processing of blocks 306-316 continues for each set of records to be migrated to the new location. At block 322, the data records to be moved during the reorganization have been moved to the new location.

The use of RRLs on external locking facilities permits the serialization of data writes across the entire OLTP processor complex. In addition, it is important to ensure serialization of data writes and prevention of collisions within each individual processor in the complex. This is accomplished by using a processor unique memory resident table, referred to herein as the reorganization lock sequence control (RLSC) table. The RLSC table is stored in the main memory of each processor in the OLTP system. Each processor has its own unique copy. The RLSC table utilizes a hashing technique to convert a record file reference into an index in the RLSC table.

The RLSC table consists of a prime number of slots or entries. These entries are pointers to storage areas which control the I/O operations (e.g., IOCBs) for individual data record operation (reads or writes). This table is used only when it is determined that the data record is within a set of data records being actively copied from the current location to the new (alternate) location by an ODBR. First the hash index is computed and the correct slot is examined to see if an IOCB pointer is present. If not present, then the pointer to the current IOCB is stored into the slot entry and processing continues. If the slot did have an IOCB pointer present, that IOCB's file address information is compared to the current IOCB's file address information. If both IOCB's are for the same data record, an internal collision has occurred and the current IOCB's pointer will be queued/chained out of the slot IOCB's vertical chaining field. Note that if additional IOCBs are found in the vertical chain, then the current IOCB will be placed as the last in chain on the vertical chain.

If there was no vertical chain found, then the slots IOCBs horizontal chain pointers are examined to see if any IOCBs in the horizontal chain match the file address information in the current IOCB. If no matches are found, then the current IOCB is placed as the end of the horizontal chain, no collision has occurred, and processing continues. However, if a horizontal chain IOCB is found which matches the file address location information, then an internal collision has occurred and the current IOCB is queued/chained in the vertical chain of the IOCB found to contain the same addressing information. During the ODBR process, customer application retrieval and update of data records is from/to the current (original) location on DASD (both prime and mirrored copies).

By embedding the RRL process inside of existing locking protocols, data updates are protected from collisions with the ODBR relocation operation. The RRL is set for the record in the external lock facility identified with the original location data location (the same as existing locks).

Figure 4:
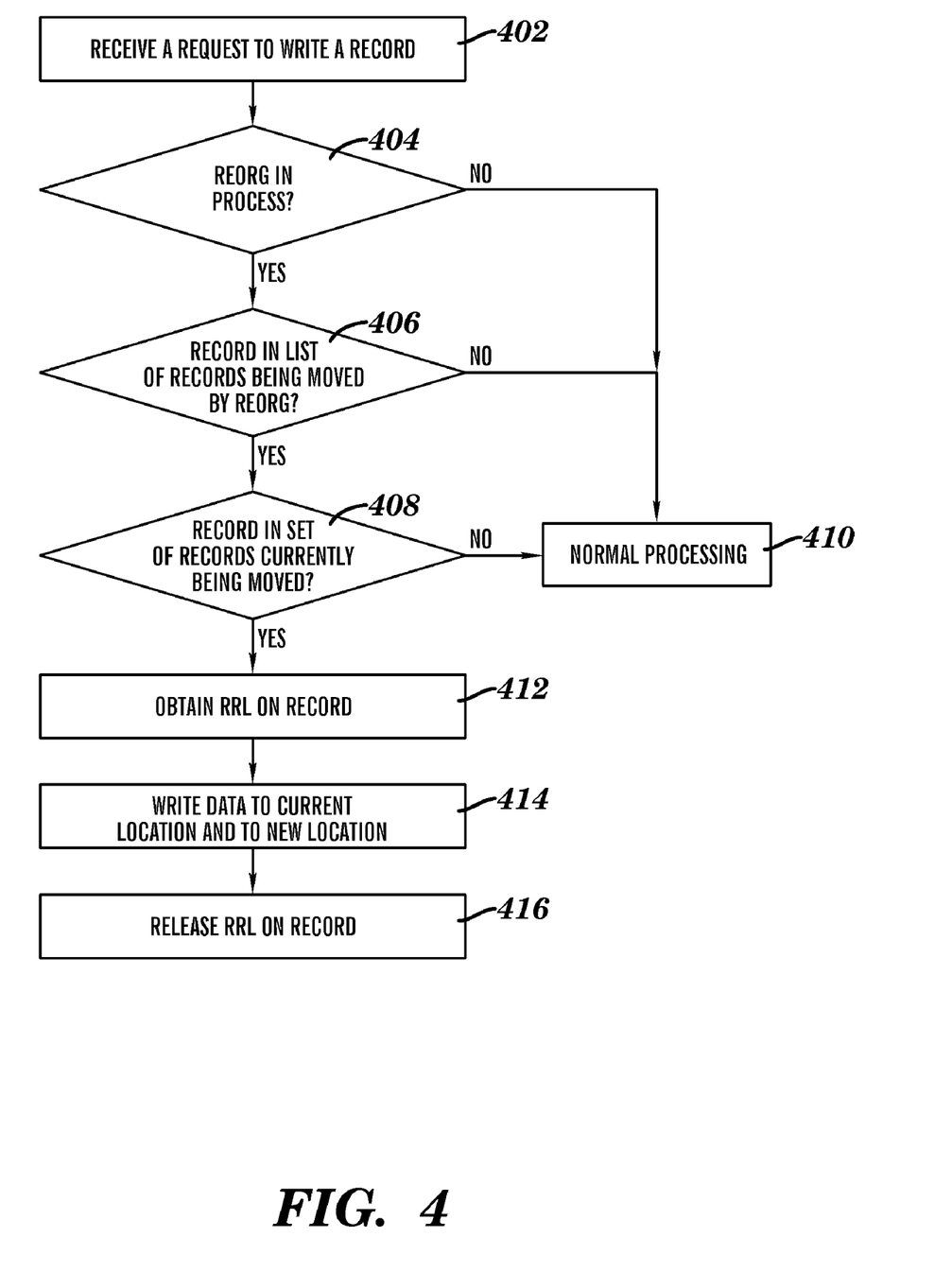
FIG. 4 illustrates a process flow for obtaining collision protection handling for a record during an ODBR in accordance with an embodiment.

FIG. 4 illustrates a process flow for obtaining collision protection handling for a record during an ODBR process in accordance with an embodiment. The process flow described herein is executed on a processor in an environment such as z/TPF 122 on computing device 120 in FIG. 1. At block 402, an application requires collision write access to a record. At block 404, it is determined (e.g. by the z/TPF O/L transaction process) that there is an ODBR session in progress. At block 406, the normal record file logic in the OS identifies whether a record being filed is a candidate for relocation to an alternate DASD location. This is done by a routine that decodes the user file address reference for the record into the physical location of the data record on the external data storage unit. If the data record being filed is identified as one scheduled to be relocated (i.e., it is in the OMST), an additional check is performed at block 408 to determine if that record is in a group of data records which are actively in the process of being copied to the new (alternate) location. Note that the in-memory control table contains data that has been synchronized across all participating, networked processors in the OLTP system so that each processor has the same view of data being moved at that moment. If the data record is within the range of those records actively being copied to their alternate location there is a need for collision protection to enforce serialization of data update for this record across the OLTP system. This is accomplished at block 412 by use of a RRL. Prior to writing the data record out to file, the operating system will execute new logic which will obtain exclusive ownership of the RRL.

At block 414, once the lock is obtained, the data is written to the current location and to the new location. At block 414, once the writing is complete, the RRL is released for the data record. The RRL is maintained on the appropriate external locking facility (same location as any other locks used for this data record). If the application is not immediately able to obtain the RRL, this request is queued internally until RRL exclusive ownership is obtained by this request. This process is transparent to the typical application program. Data integrity is ensured by adhering to the current system locking protocols. Once the RRL is obtained and the data record is written to the current and new (both prime and mirrored) locations, the RRL ownership is relinquished.

Figure 5:
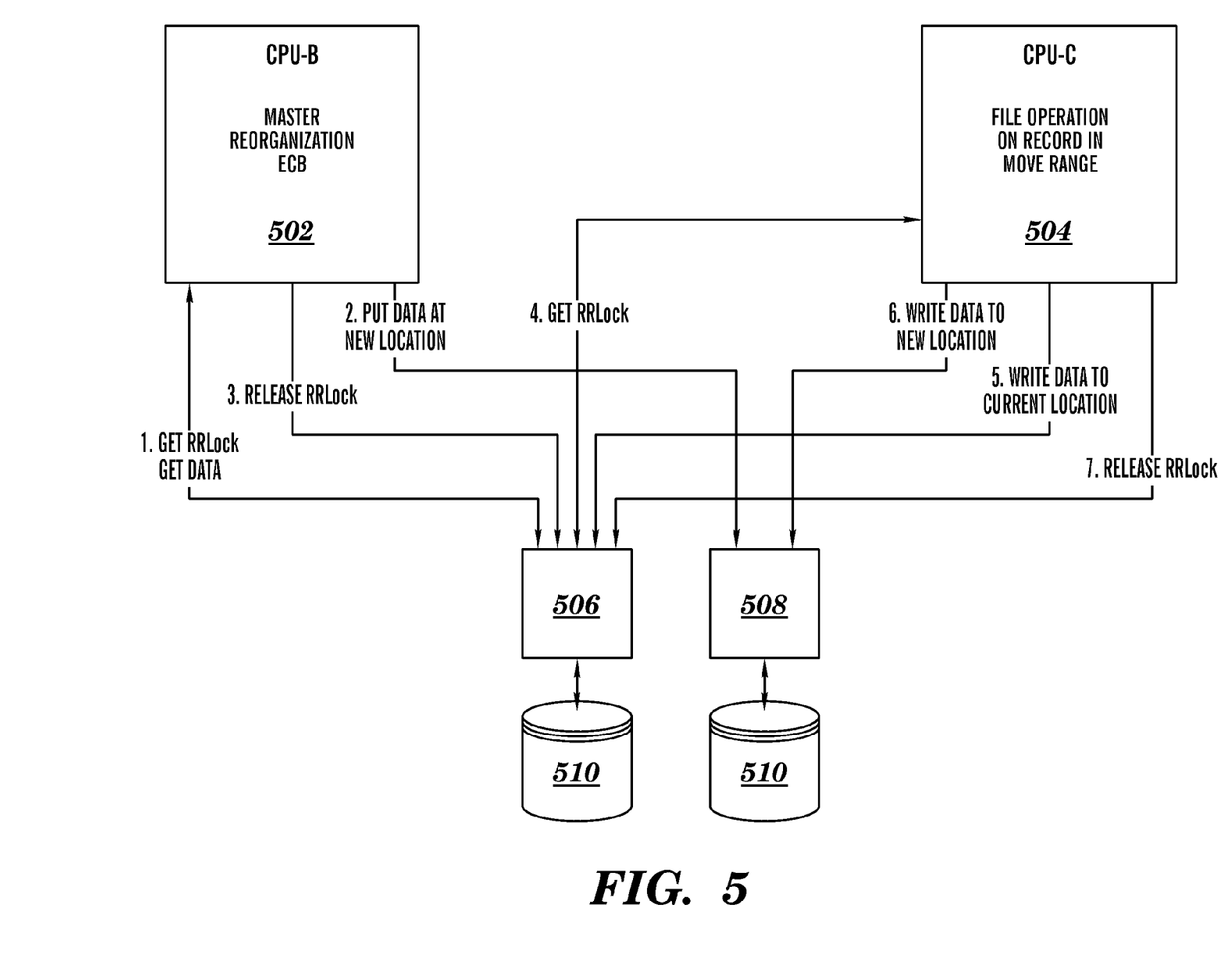
FIG. 5 illustrates record reorganization lock (RRL) usage when an ODBR and a file operation do not interleave and no RRL collision occurs in accordance with an embodiment.

FIG. 5 illustrates record reorganization lock (RRL) usage when an ODBR and a file operation (e.g., request by an application) do not interleave and no RRL collision occurs in accordance with an embodiment. As used herein, the term "file operation" refers to a request to write an updated record to an external resident database by and application or system utility using a standard interface provided by the operating system. FIG. 5 includes CPU B 502 that is performing an ODBR and CPU C 504 that is executing an application that is requesting a file operation that requires write access to a record being moved by the ODBR. In addition, FIG. 5 illustrates a control unit 506 to access a current database in a current location and a control unit 508 to access a target database in a new location, as well as two corresponding storage devices 510. The process shown in FIG. 5 includes: 1. CPU B 502 obtains a RRL lock on a data record about to be moved; 2. CPU B 502 stores the data at the new location; and 3. CPU B 502 releases the RRL. Next: 4. CPU C 504 requests a RRL on the data record; 5. CPU C 504 writes data to the current location of the data record; 6. CPU C 504 writes data to the new location of the data record; and 7. CPU C 504 releases the RRL lock on the data record. In this example, there is no contention for the data record as CPU B 502 accesses it first and after CPU B 502 is done, an application executing on CPU C 504 accesses the data record.

Figure 6:
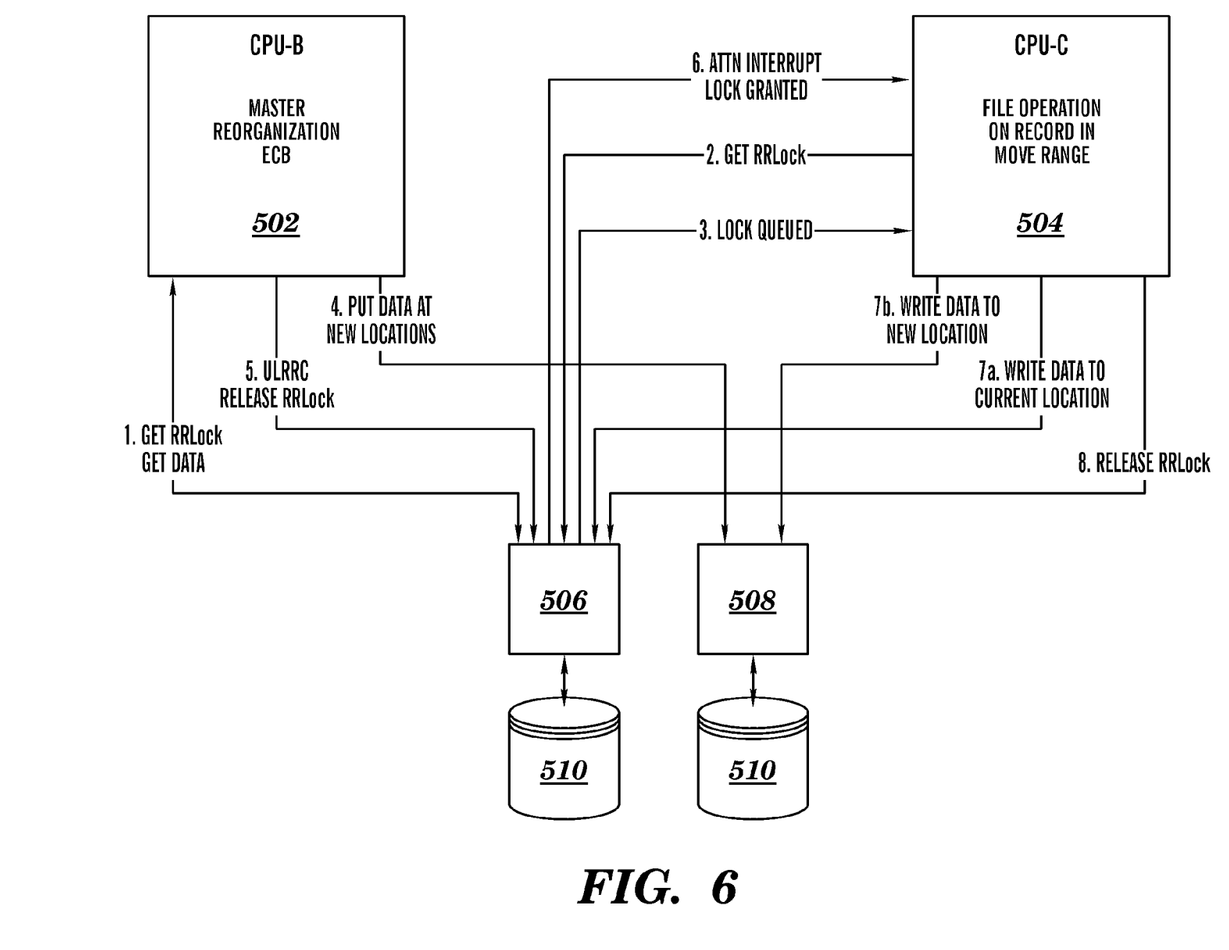
FIG. 6 illustrates processing of a RRL collision that occurs when an ODBR obtains a RRL on a record that is subsequently requested by a file operation in accordance with an embodiment.

FIG. 6 illustrates processing of a RRL collision that occurs when an ODBR obtains a RRL on a record that is subsequently requested by a file operation; in accordance with an embodiment. In this example, the requests to access the data record overlap between CPU B 502 and CPU C 504. The process shown in FIG. includes: 1. CPU B 502 obtains a RRL on a data record; 2. CPU C 504 requests a RRL lock on the same data record; 3. CPU C 504 gets its RRL request queued; 4. CPU B 502 stores the data at the new location; and 5. CPU B 502 releases the RRL. Next: 6. CPU C 504 receives a RRL on the data record; 7a. CPU C 504 writes data to the current location of the data record; 7b. CPU C 504 writes data to the new location of the data record; and 8. CPU C 504 releases the RRL lock on the data record. In this example, contention for the data record between CPU B 502 and CPU C 504 is resolved using the RRL.

Figure 7:
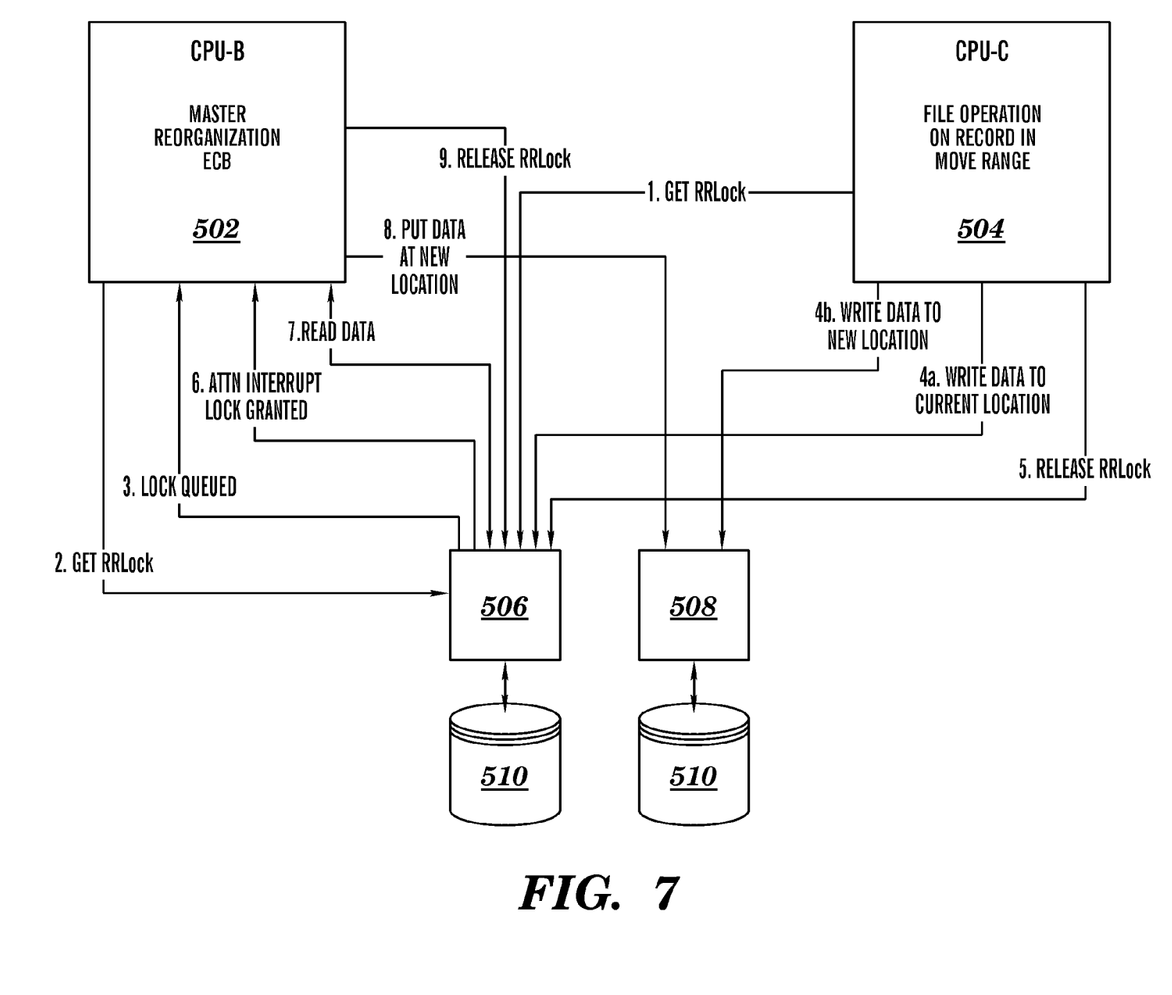
FIG. 7 illustrates processing of a RRL collision that occurs when a file operation obtains a RRL on a record that is subsequently requested by an ODBR in accordance with an embodiment.

FIG. 7 illustrates processing of a RRL collision that occurs when a file operation obtains a RRL on a record that is subsequently requested by an ODBR in accordance with an embodiment. In this example, the requests to access the data record overlap between CPU B 502 and CPU C 504. The process shown in FIG. includes: 1. CPU C 504 requesting and obtaining a RRL on a data record; 2. CPU B 502 requesting a RRL on the same data record; 3. CPU B 502 getting its RRL request queued; 4a. CPU C 504 writes data to the current location of the data record; 4b. CPU C 504 writes data to the new location of the data record; and 5. CPU C 504 releases the RRL lock on the data record. Next: 6. CPU B 502 receives a RRL on the data record; 7. CPU B 502 reads the data from the current location; 8. CPU B 502 stores the data at the new location; and 9. CPU B 502 releases the RRL. In this example, contention for the data record between CPU B 502 and CPU C 504 is resolved using the RRL.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   identifying a set of records in a database for relocation during an on-line database reorganization (ODBR) process, each record associated with a unique record reorganization lock (RRL);
   relocating, by a computer, the set of records from a current location to a new location, the relocating including for each record in the set of records:
      requesting a record reorganization lock (RRL) associated with the record;
      receiving the RRL associated with the record, the RRL associated with the record configured to prevent access to both the current location and the new location of the record;
      retrieving data from the current location of the record;
      storing the data in the new location of the record; and
      releasing the RRL associated with the record;
   receiving a request to update a target record in the set of records with updated data, the receiving a request to update a target record overlapping in time with at least a portion of the relocating and the receiving a request to update a target record received from an application;
   requesting a RRL associated with the target record, the RRL associated with the target record configured to prevent access to both the current location and the new location of the target record, the requesting independent of the application;
   receiving the RRL associated with the target record;
   updating the target record, the updating comprising writing target data to the target record in the current location and writing the target data to the target record in the new location; and
   releasing the RRL associated with the target record.

2. The method of claim 1, wherein the ODBR process occurs while the database is on-line.

3. The method of claim 1, further comprising, responsive to the relocating completing, causing subsequent updates to data in the set of records to be copied to the new location.

4. The method of claim 1, wherein the database is accessed by a plurality of processors.

5. The method of claim 1, wherein the new location storing the data in the new location of the record comprises storing the data in a primary location of the new location and in its mirrored location of the new location.

6. The method of claim 1, wherein the ODBR process is performed by an on-line transaction processing system.

7. The method of claim 1, wherein the RRLs are exclusive locks.

8. A system comprising a processor configured to perform a method, the method comprising:
   identifying a set of records in a database for relocation during an on-line database reorganization (ODBR) process, each record associated with a unique record reorganization lock (RRL);
   relocating, by a computer, the set of records from a current location to a new location, the relocating including for each record in the set of records:
      requesting a record reorganization lock (RRL) associated with the record;
      receiving the RRL associated with the record, the RRL associated with the record configured to prevent access to both the current location and the new location of the record;
      retrieving data from the current location of the record;
      storing the data in the new location of the record; and
      releasing the RRL associated with the record;
   receiving a request to update a target record in the set of records with updated data, the receiving a request to update a target record overlapping in time with at least a portion of the relocating and the receiving a request to update a target record received from an application;
   requesting a RRL associated with the target record, the RRL associated with the target record configured to prevent access to both the current location and the new location of the target record, the requesting independent of the application;
   receiving the RRL associated with the target record;
   updating the target record, the updating comprising writing target data to the target record in the current location and writing the target data to the target record in the new location; and
   releasing the RRL associated with the target record.

9. The system of claim 8, wherein the ODBR process occurs while the database is on-line.

10. The system of claim 8, wherein the method further comprises: responsive to the relocating completing, causing subsequent updates to data in the set of records to be copied to the new location.

11. The system of claim 8, wherein the database is accessed by a plurality of processors.

12. The system of claim 8, wherein the new location storing the data in the new location of the record comprises storing the data in a primary location of the new location and in its mirrored location of the new location.

13. The system of claim 8, wherein the ODBR process is performed by an on-line transaction processing system.

14. The system of claim 8, wherein the RRLs are exclusive locks.

15. A computer program product comprising a tangible storage medium readable by a processing circuit and storing instructions for execution by the processing circuit for performing a method comprising:
   identifying a set of records in a database for relocation during an on-line database reorganization (ODBR) process, each record associated with a unique record reorganization lock (RRL);
   relocating, by a computer, the set of records from a current location to a new location, the relocating including for each record in the set of records:
      requesting a record reorganization lock (RRL) associated with the record;
      receiving the RRL associated with the record, the RRL associated with the record configured to prevent access to both the current location and the new location of the record;
      retrieving data from the current location of the record;
      storing the data in the new location of the record; and
      releasing the RRL associated with the record;
   receiving a request to update a target record in the set of records with updated data, the receiving a request to update a target record overlapping in time with at least a portion of the relocating and the receiving a request to update a target record received from an application;

requesting a RRL associated with the target record, the RRL associated with the target record configured to prevent access to both the current location and the new location of the target record, the requesting independent of the application;

receiving the RRL associated with the target record;

updating the target record, the updating comprising writing target data to the target record in the current location and writing the target data to the target record in the new location; and releasing the RRL associated with the target record.

16. The computer program product of claim 15, wherein the ODBR process occurs while the database is on-line.

17. The computer program product of claim 15, wherein the method further comprises: responsive to the relocating completing, causing subsequent updates to data in the set of records to be copied to the new location.

18. The computer program product of claim 15, wherein the database is accessed by a plurality of processors.

19. The computer program product of claim 15, wherein the new location storing the data in the new location of the record comprises storing the data in a primary location of the new location and in its mirrored location of the new location.

20. The computer program product of claim 15, wherein the ODBR process is performed by an on-line transaction processing system.

* * * * *